United States Patent [19]

Buedel

[11] 4,180,855
[45] Dec. 25, 1979

[54] DIRECT MEMORY ACCESS EXPANDER UNIT FOR USE WITH A MICROPROCESSOR

[75] Inventor: Charles K. Buedel, Wood Dale, Ill.

[73] Assignee: GTE Automatic Electric Laboratories Incorporated, Northlake, Ill.

[21] Appl. No.: 894,223

[22] Filed: Apr. 7, 1978

[51] Int. Cl.² ............................................. G06F 13/00
[52] U.S. Cl. .................................................. 364/200
[58] Field of Search ... 364/200 MS File, 900 MS File

[56] References Cited

U.S. PATENT DOCUMENTS

| 4,067,059 | 1/1978 | Derchak | 364/200 |
| 4,075,691 | 2/1978 | Davis et al. | 364/200 |
| 4,099,236 | 7/1978 | Goodman et al. | 364/200 |

*Primary Examiner*—Gareth D. Shaw
*Assistant Examiner*—Thomas M. Heckler
*Attorney, Agent, or Firm*—Frank J. Bogacz

[57] ABSTRACT

A direct memory access unit for controlling a predetermined number of peripheral devices which directly read from and write into a memory associated with a microprocessor. Control of a plurality of peripheral devices by the direct memory access unit is performed on a non-priority basis, by a number of modular circuits connected in cascade.

8 Claims, 3 Drawing Figures

DIRECT MEMORY ACCESS EXPANDER UNIT FOR USE WITH A MICROPROCESSOR

BACKGROUND OF THE INVENTION

(1) Field of the Invention

The present invention relates to microprocessor control of main memory and more particularly to direct memory access by a plurality of peripheral devices to the main memory of a microprocessor on a non-priority basis.

(2) Description of the Prior Art

Direct memory access (DMA) to a microprocessor's main memory is a well known technique. Many microprocessors provide a single DMA capability at the integrated circuit level. For example, the INTEL model 8080 central processing unit is a single LSI chip of silicon gate MOS technology with DMA capability. This central processing unit (CPU) provides for a single direct memory access by an associated peripheral device. In addition, a two phase clock is required for its operation.

Upon receipt of a hold request from a peripheral device, the central processing unit suspends its access to the main memory during the initial portion of a machine cycle. The CPU acknowledges the hold request via a hold acknowledge signal returned to the associated peripheral device. The peripheral device now has control of the address bus and data bus for reading or writing memory directly.

Microprocessors, by their nature, are intended for relatively small central processor applications. Usual applications of these processors require only a single peripheral device to be connected for direct memory access. As indicated above, the single peripheral device capacity is inherent in many central processing units.

However, in telecommunications systems where the majority of the central processing unit's real time is utilized, a plurality of direct memory access peripheral devices is required. For example, a telecommunication system may require a magnetic tape cartridge device and a manual programmer's panel to read and write memory directly; or the system may require a plurality of magnetic tape cartridge devices to operate simultaneously.

Therefore, it is the object of the present invention to provide a telecommunication system's microprocessor (such as the INTEL 8080) with the circuit means necessary to control a plurality of peripheral devices simultaneously attempting to access the microprocessor's main memory directly. In addition, it is an objective of the present invention to provide this DMA capability by a plurality of direct memory access peripheral devices in a modular form, so that should the number of peripheral devices required grow, additional access circuits may be added relatively easily to accomplish this result. It is also desirable that the direct memory access unit respond to the connected peripheral devices on a non-priority basis.

SUMMARY OF THE INVENTION

The present invention consists of a direct memory access (DMA) unit for use in a telecommunication system for expanding the direct memory access capability of a microprocessor. The direct memory access unit is connected between a microprocessor and a plurality of direct memory access peripheral devices. The connections from the direct memory access unit to the microprocessor include connections to the central processing unit and its associated two-phase clock circuit. The connections between the DMA unit and the central processing unit provide circuit paths for: a hold request signal transmitted by the DMA unit to the central processing unit and an acknowledge signal transmitted by the CPU to the DMA unit. Furthermore, the connections between each peripheral device and the DMA unit provide paths for: a peripheral device hold request signal transmitted by the peripheral devices to the DMA unit and a peripheral device acknowledge signal transmitted by the DMA unit to the peripheral devices.

In response to a peripheral device direct memory request signal, the direct memory access unit generates a hold request to the central processing unit. At the beginning of the succeeding machine cycle the central processing unit acknowledges the hold request with an acknowledge signal returned to the DMA unit. The DMA unit, in turn, determines which of the connected peripheral devices requested a direct memory access and transmits a peripheral device acknowledge signal to the requesting peripheral device. The requesting peripheral device now has full access to both the data and address buses associated with the microprocessor's main memory.

The direct memory access unit of the present invention is constructed of one or more direct memory access circuits connected in cascade configuration. Each circuit is modular in form. The initial direct memory access circuit is connected to two peripheral devices; each succeeding direct memory access circuit is connected to the preceding direct memory access circuit and to one additional peripheral device. The final direct memory access circuit in the configuration is connected to the microprocessor and one additional peripheral device. The number of direct memory access circuit modules to be interconnected for a proper configuration is a function of the number of peripheral devices to be connected to the microprocessor.

In response to a peripheral device direct memory request signal, the hold request signal generated is transmitted through all connected DMA circuit modules to the microprocessor. When the microprocessor responds with a hold acknowledge signal, this signal is transmitted back to the DMA circuit module which generated the request and the signal is processed within that circuit module as described above.

DESCRIPTION OF THE PREFERRED EMBODIMENT

Figure 3:
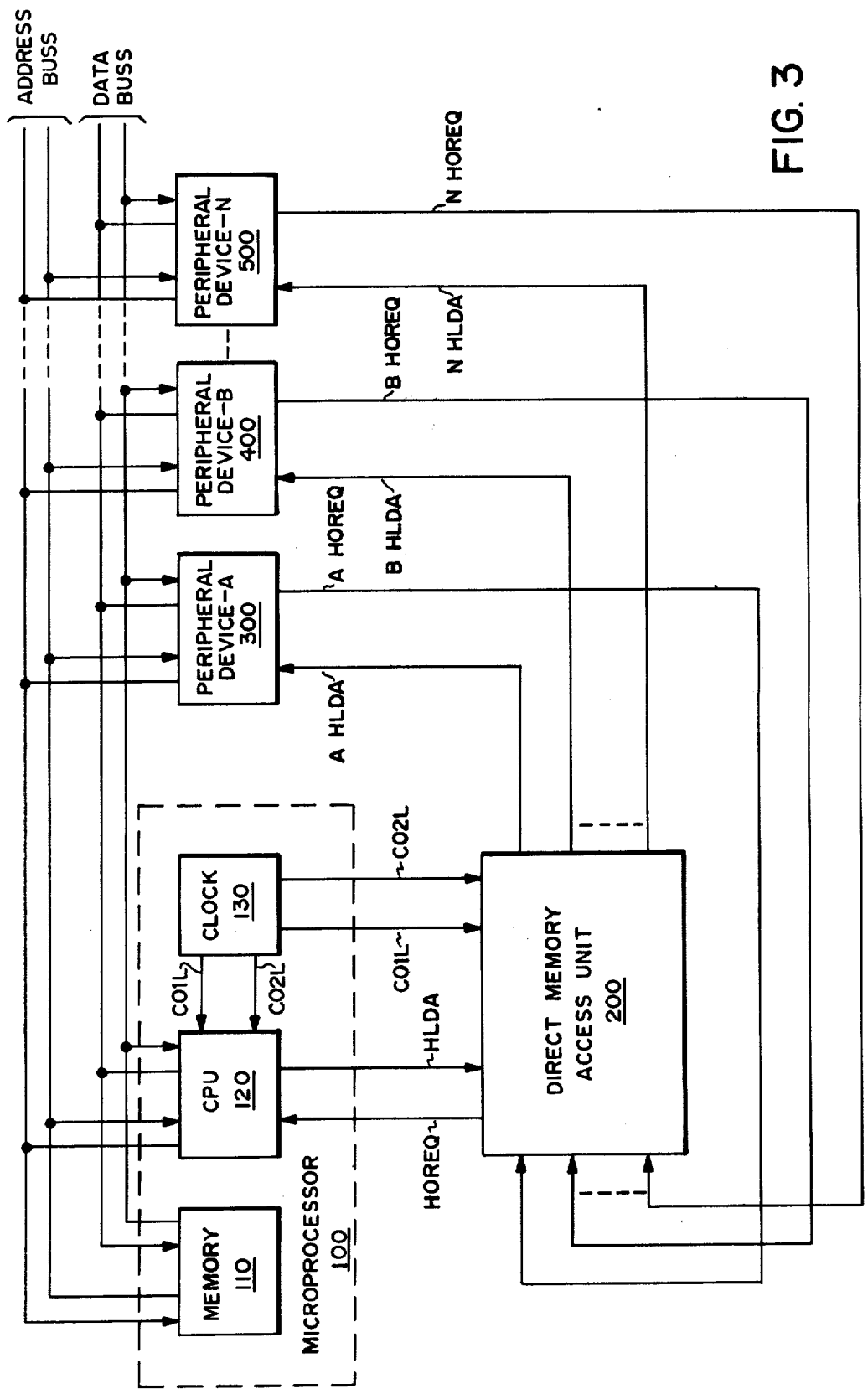
FIG. 3 is a block diagram representing the interconnections of the DMA unit to its peripheral devices and a microprocessor.

Referring to FIG. 3, the Applicant's direct memory access unit (DMA) 200 is shown connected to a microprocessor 100 and a plurality of peripheral devices (300, 400, 500, etc.). Each peripheral device is also connected to both the data and address buses. Central processing unit (CPU) 120 of microprocessor 100 controls all access via the address and data buses to memory 110.

Clock circuit 130 is connected to both CPU 120 and to the direct memory access unit 200, and provides the two-phase timing necessary for the operation of both circuits. Memory 110 is connected to the address and data buses.

Typically, the CPU 120 accesses memory 110 sequentially in order to extract a series of instructions to be executed the CPU. A peripheral device, such as a magnetic tape cartridge, requires a direct access to memory 110. To accomplish this, peripheral device-A 300, for example, transmits a signal A HOREQ to DMA unit 200. Simultaneously, peripheral device-B 400, a manual programmer's panel, initiates a request to read memory 110 by transmisison of signal B HOREQ to direct memory access unit 200. Based upon these two simultaneous hold request signals from the peripheral devices and the value of the output signal phases (CO1L and CO2L) of clock circuit 130, one of the peripheral devices hold request signals is selected for processing by DMA unit 200. As a result, DMA unit 200 transmits a hold request signal HOREQ to CPU 120. At the beginning of a subsequent machine cycle, CPU 120 will suspend its operation of memory 110 and return a hold acknowledge signal HLDA to DMA unit 200. Depending upon which peripheral device was initially selected, DMA unit 200 transmits a hold acknowledge signal HLDA to the selected peripheral device, for example signal A HLDA is returned to peripheral device-A 300. Now, peripheral device-A has control over both the data and address buses and can read or write memory 110. At the completion of this task by peripheral device-A 300, the hold request signal A HOREQ is removed from DMA unit 200. In response to this removal of hold request signal by peripheral device-A 300, DMA unit 200 removes the hold request signal HOREQ from the CPU 120 and subsequently processes the hold request signal B HOREQ, transmitted by peripheral device-B 400, similar to that described above for peripheral device-A 300. When other peripheral devices, such as peripheral device-N 500, simultaneously or subsequently request direct memory access via a hold request signal N HOREQ, these requests are processed similarly by DMA unit 200.

Figure 1:
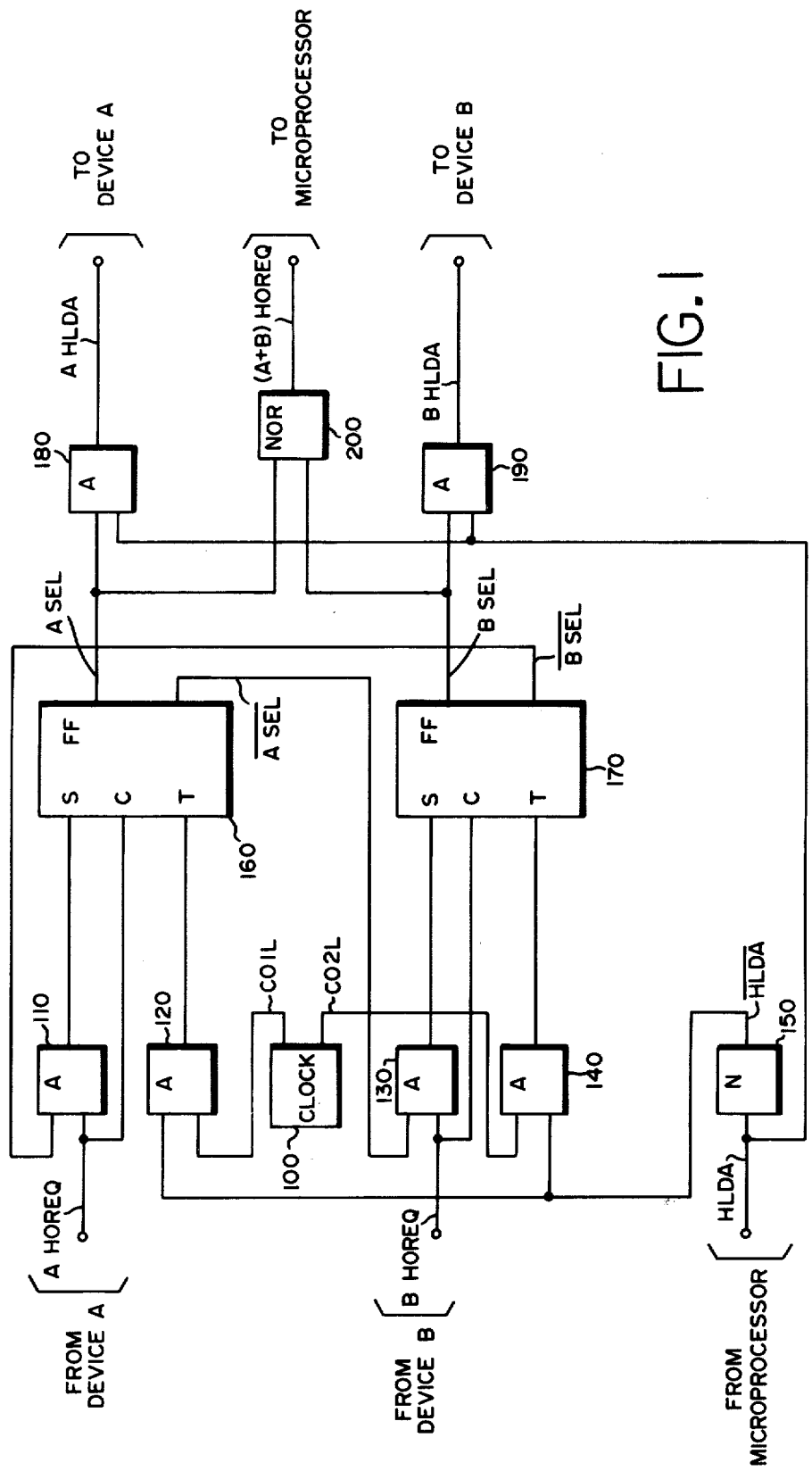
FIG. 1 is a schematic diagram of a direct memory access unit composed of a single DMA circuit module.

Now referring to FIG. 1, a schematic drawing representing a direct memory access unit comprising a single circuit module is shown. Peripheral devices A and B are shown connected to AND gates 110 and 130 respectively. In addition, the peripheral devices A and B are connected to the clear input C of flip-flop devices 160 and 170 respectively. The flip-flop devices consist of monolithic D-Type edge-triggered flip-flops (Signetics Model S5474). The set inputs S of flip-flop devices 160 and 170 are respectively connected to AND gates 110 and 130 and the trigger inputs T of these flip-flop devices are respectively connected to AND gates 120 and 140. Also, clock circuit 100 has connections to AND gates 120 and 140. Inverter 150 is connected to each of the AND gates 120 and 140. NOR gate 200 is connected between each of the flip-flop devices 160 and 170 and the microprocessor. AND gates 180 and 190 are connected between flip-flop devices 160 and 170 respectively and their corresponding peripheral devices A and B.

When peripheral device-A initiates a hold request via signal A HOREQ of value "1" this signal is combined by AND gate 110 with signal $\overline{B\ SEL}$ which is also at a value of "1" to produce a signal of value "1" at the S input flip-flop device 160. As a result, flip-flop 160 is enabled and signals A SEL and $\overline{A\ SEL}$ will take on the values of "1" and "0" respectively, when signal CO2L becomes a value of "1." Signal A SEL is applied to the microprocessor through NOR gate 200. In response to the application of this signal, the microprocessor responds with a HLDA signal of value "1." Signals HLDA and A SEL are combined via AND gate 180 thereby generating signal A HLDA, the acknowledge signal corresponding to the peripheral device-A. Peripheral device-A now has control of both the address and data buses for communication with the microprocessor's memory. During this time, signal $\overline{A\ SEL}$ is at logic "0" and has been applied to AND gate 130 to prevent peripheral device-B's memory request from being processed by the DMA unit.

When peripheral device-B initiates a hold request signal via B HOREQ equal to "1," AND gates 130, 140 and 190 and flip-flop device 170 perform correspondingly to the description for peripheral device-A given above. When peripheral devices A and B simultaneously request memory access, clock circuit 100 selects which of the two requests will be processed first. This is accomplished by signals CO1L and CO2L; which cannot both take on the value "1" simultaneously. Whichever phase signal (CO1L or CO2L) is at logic "1" at the time of the request will trigger the appropriate flip-flop device 160 or 170 corresponding to memory hold request signals (A HOREQ and B HOREQ) from peripheral devices A and B respectively.

Figure 2:
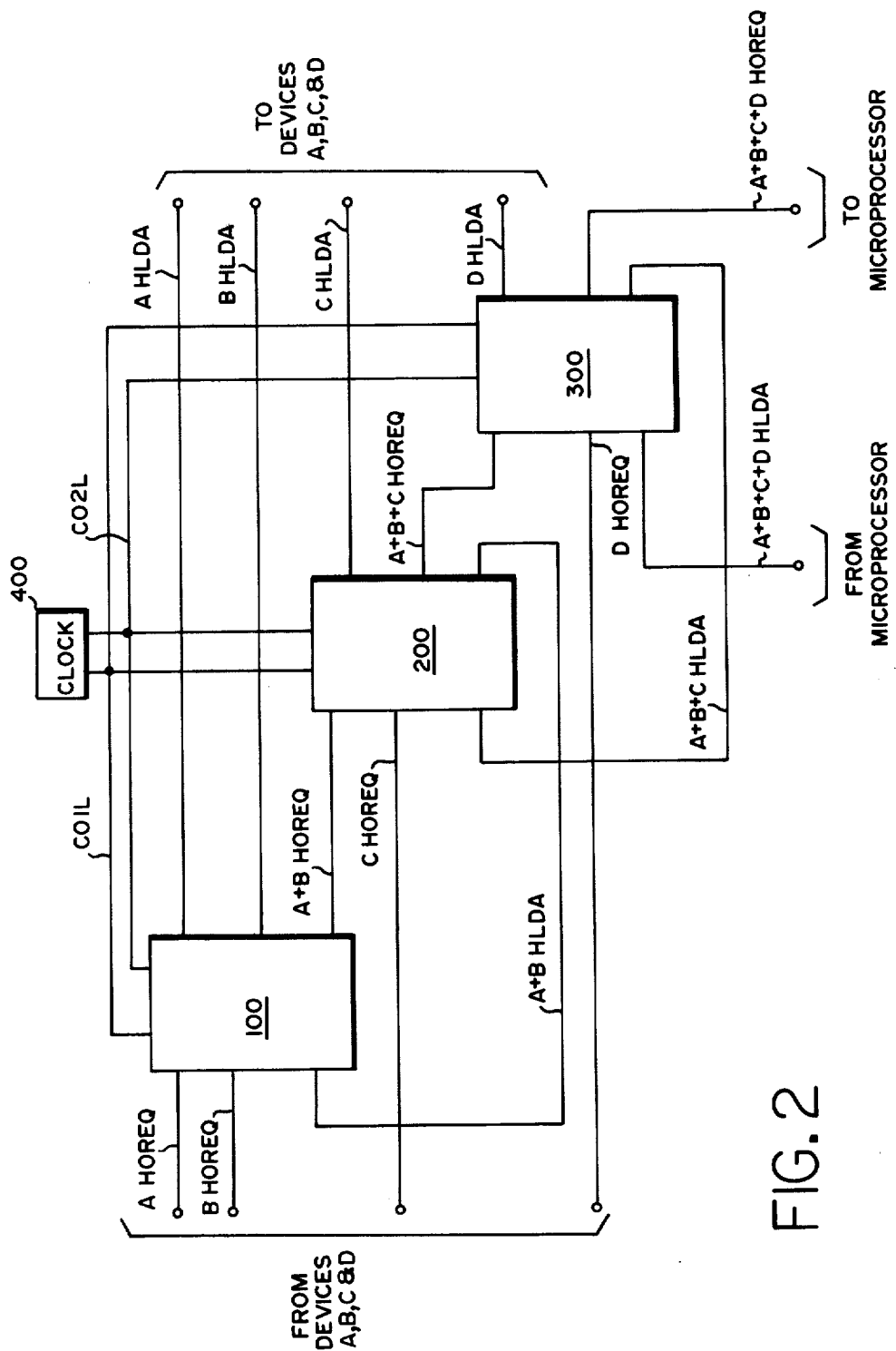
FIG. 2 is a block diagram depicting the interconnection of a direct memory access unit comprising a multiple of DMA circuit modules.

Lastly, referring to FIG. 2, the interconnection of a number of direct memory access circuit modules (each as depicted in FIG. 1) is shown which allows direct memory access by more than two peripheral devices simultaneously.

Direct memory access modules 100, 200 and 300 are shown permitting direct memory access by up to four peripheral devices (A through D). Although three DMA circuit modules are shown, this invention is not limited to three such modules. The number of circuit modules that may be employed is a function of the number of peripheral circuits to be served.

DMA circuit module 100 is connected between two peripheral devices A and B as shown in FIG. 1. However, output signal A + B HOREQ is now transmitted to DMA circuit module 200 as a peripheral device. DMA circuit module 200 is additionally connected to a third peripheral device-C and, its output signal A + B + C HOREQ is transmitted as a peripheral device to DMA circuit module 300. In addition, DMA circuit module 300 is connected to a fourth peripheral device-D. Lastly, DMA circuit module 300 is connected to the microprocessor, as described above in FIG. 1. Each DMA circuit module is connected to the clock circuit 400 and operated in response to phases CO1L and CO2L.

When peripheral device-D is the requesting device, DMA circuit module 300 processes this device as described above in FIG. 1. When peripheral device-C is the requesting device, hold acknowledge signal A + B + C + D HLDA is transmitted back from DMA module 300 to DMA module 200 and peripheral device-C's memory request is handled, as described above in FIG. 1. In the event that peripheral device-A or B is the requesting device, hold acknowledge signal A + B + C + D HLDA is transmitted from the microprocessor to DMA module 300 whereby, it is transformed to hold acknowledge signal A + B + C HLDA, and in response DMA module 200 transforms it to acknowledge signal A+B HLDA which is transmitted to DMA module 100 wherein, it is processed as described above in FIG. 1. A greater number of peripheral devices can be similarly connected and would be similarly processed.

Although a preferred embodiment of the invention has been illustrated, and that form described in detail, it will be readily apparent to those skilled in the art that various modifications may be made therein without departing from the spirit of the invention or from the scope of the appended claims.

What is claimed is:

1. A direct memory access unit for use in a microprocessor including a central processing unit operable to transmit only a single hold acknowledge signal, a memory connected to said central processing unit and a clock circuit operated to generate first and second phase output signals, said direct memory access unit operable to control a plurality of associated peripheral devices, at least one of said peripheral devices, requiring direct access to said memory via said central processing unit, each operated to transmit a memory request signal, said direct memory access unit including one direct memory access circuit comprising:
   first gating means connected to at least one of said peripheral devices and connected to said clock circuit of said central processing unit, operated in response to said memory request signal, to said single hold acknowledge signal and in response to said first and second phase output signals of said clock circuit in order to produce a plurality of signals representing the memory access status of each of said connected peripheral devices;
   a plurality of latching means each connected to a corresponding peripheral device and to said first gating means, operated in response to said operation of said first gating means to produce a plurality of output signals each indicating the memory access status of a corresponding peripheral device;
   second gating means for combining said latching means output signals, connected to said latching means and to said microprocessor, operated in response to said latching means output signals to generate a single output signal for transmission to said microprocessor; and
   third gating means connected to a corresponding one of said plurality of peripheral devices and to said latching means, whereby in response to said latching means output signals and said single hold acknowledge signal transmitted by said microprocessor, a device acknowledge signal is transmitted to the requesting one of said plurality of peripheral devices.

2. A direct memory access unit as claimed in claim 1, wherein: there is further included,
   a second direct memory access circuit wherein said first gating means, said third gating means and said latching means are connected to a different corresponding peripheral device and said second direct memory access circuit is connected between said one direct memory access circuit and said microprocessor.

3. A direct memory access unit as claimed in claim 1, wherein: there is further included,
   a plurality of additional direct memory access circuits connected to each other in cascade configuration; said first gating means, said third gating means and said latching means in each of said plurality of additional direct memory access circuits connected to a different corresponding peripheral device; and said plurality of cascade configured direct memory access circuits is connected between said one direct memory access circuit and said microprocessor.

4. A direct memory access unit as claimed in claim 1, wherein: said latching means are further connected to said first gating means so that one of said plurality of latching means output signals inhibits the remaining ones of said plurality of latching means output signals.

5. A direct memory access unit as claimed in claim 1, wherein: inverting means are connected between said microprocessor and said first gating means.

6. A direct memory access unit as claimed in claim 1, wherein: each of said latching means includes a D-Type edge-triggered flip-flop.

7. A direct memory access unit as claimed in claim 1, wherein: said first gating means includes a plurality of AND gates, each connected to said latching means.

8. A direct memory access unit as claimed in claim 1, wherein: said third gating means includes at least two AND gates each connected between said latching means and a corresponding peripheral device.

* * * * *